W. B. TWEEDLE.
FAUCET.
No. 193,430. Patented July 24, 1877.
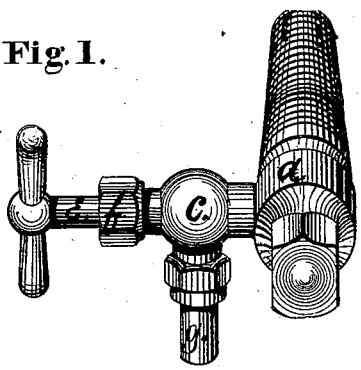
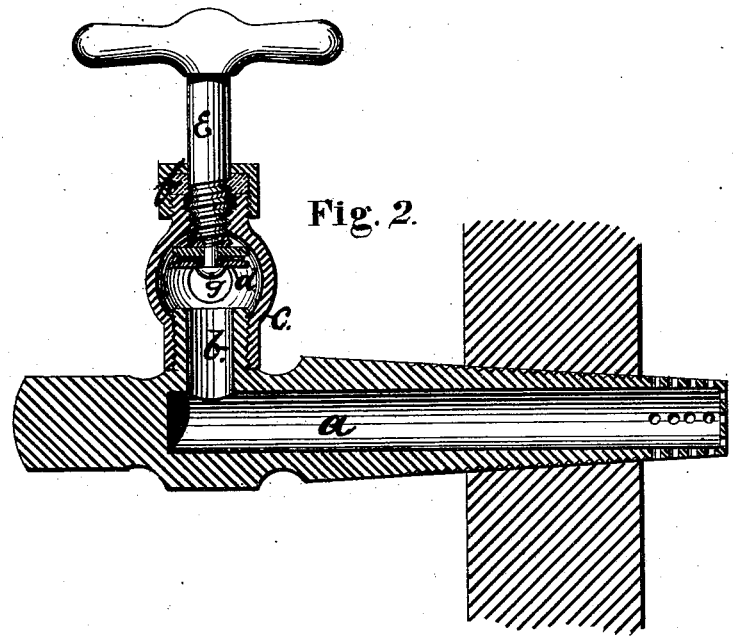
WITNESSES.
D. M. Thompson.
Jos. A. Miller Jr.
INVENTOR.
William B Tweedle
by Joseph A Miller
Attorney

UNITED STATES PATENT OFFICE.

WILLIAM B. TWEEDLE, OF PROVIDENCE, RHODE ISLAND, ASSIGNOR OF ONE-HALF HIS RIGHT TO CHARLES T. CADY, OF SAME PLACE.

IMPROVEMENT IN FAUCETS.

Specification forming part of Letters Patent No. 193,430, dated July 24, 1877; application filed April 25, 1877.

*To all whom it may concern:*

Be it known that I, WILLIAM B. TWEEDLE, of the city and county of Providence, State of Rhode Island, have invented certain new and useful Improvements in Faucets; and I hereby declare that the following is a full, clear, and exact description of the same, reference being had to the accompanying drawings, forming part of this specification:

Figure 1 is a perspective view of my improved faucet, and Fig. 2 is a section of the same.

This invention has reference to improvements in faucets that require to be repeatedly driven into barrels; and consists in the peculiar arrangement by which the valve is secured separately to a branch pipe, which also forms the valve-seat, so that in driving the faucet into the barrel the valve cannot be injured by the blow, as is the case where the valve is located within the main body of the faucet.

In the drawings, $a$ is the faucet proper, provided at the outer end with a knob to receive the blow of the mallet, and at its inner end with perforations to act as strainers. $b$ is the branch pipe, the end of which is arranged to form the valve-seat. $c$ is the valve-case; $d$, the valve-disk; $f$, a stuffing-box, and E the valve-stem. $g$ is the discharging-tube, which may be used to discharge directly, or, as shown, with a coupling, so as to connect the faucet with a pipe.

When the ordinary beer-faucet is driven into a barrel the blow distorts the metal forming the case for the valve or plug, as this portion of the faucet is the weakest, and has no central support to resist the force of the blow. At first the hole becomes oval, and, after repeated blows, it breaks. Plugs or valves cannot be kept tight in such faucets.

In my invention the branch pipe $b$ does not weaken the main body; the valve-seat can be readily examined and a new valve-disk substituted; the stem is readily packed, and the whole is simple and efficient. It cannot be injured by driving it into the barrel, and a pipe can be readily attached to lead to any place desired.

Having thus described my invention, I claim as new and desire to secure by Letters Patent—

1. The combination, with the faucet $a$ and branch $b$, of the detachable valve-case $c$, the valve-disk $d$, and stem E, provided with the stuffing-box $f$, arranged and operating substantially as and for the purpose described.

2. The combination, with the faucet $a$ $b$ and detachable valve, substantially as described, of the outlet-pipe $g$, provided with a suitable device to connect the faucet with a pipe, all arranged substantially as and for the purpose specified.

WILLIAM B. TWEEDLE.

Witnesses:
JOSEPH A. MILLER,
AMOS A. WHITE.